United States Patent [19]

Blaimschein

[11] Patent Number: 5,205,196
[45] Date of Patent: Apr. 27, 1993

[54] MACHINE TOOL, PARTICULARLY CUTTING MACHINE

[75] Inventor: Gottfried Blaimschein, Steyr, Austria

[73] Assignee: GFM Gesellschaft für Fertigungstechnik und Maschinenbau Aktiengesellschaft, Steyr, Austria

[21] Appl. No.: 804,130

[22] Filed: Dec. 6, 1991

[30] Foreign Application Priority Data

Dec. 13, 1990 [EP] European Pat. Off. ........ 90890322.2

[51] Int. Cl.⁵ .......................... B65H 16/00; B26F 1/38
[52] U.S. Cl. ........................................ 83/272; 83/277;
83/937; 83/940; 226/108; 242/55
[58] Field of Search ................. 83/277, 272, 206, 953,
83/940, 937; 226/108; 242/55

[56] References Cited

U.S. PATENT DOCUMENTS

| 4,381,686 | 5/1983 | Ess | 83/256 X |
| 4,514,246 | 4/1985 | Forrer et al. | 156/264 |
| 5,007,317 | 4/1991 | Jenkner | 83/256 X |

Primary Examiner—Hien H. Phan
Assistant Examiner—Kenneth E. Peterson
Attorney, Agent, or Firm—Collard & Roe

[57] ABSTRACT

A machine tool for processing flat stock comprises a work table having a processing surface, which can preferably be subjected to a vacuum, and a tool carriage, which is movable along the processing surface. A feeder is associated with the work table at one end thereof. In order to provide such a machine tool which involves a relatively small structural expenditure and distinguishes by an economical mode of operation, the work table is supplemented toward the feeder by a receiving table having a receiving surface of the work table, and the machine table composed of the work table and the receiving table supports two pallets, which are reciprocable between positions on the work table and the receiving table and in alternation constitute the processing surface of the work table and the receiving surface of the receiving table.

10 Claims, 4 Drawing Sheets

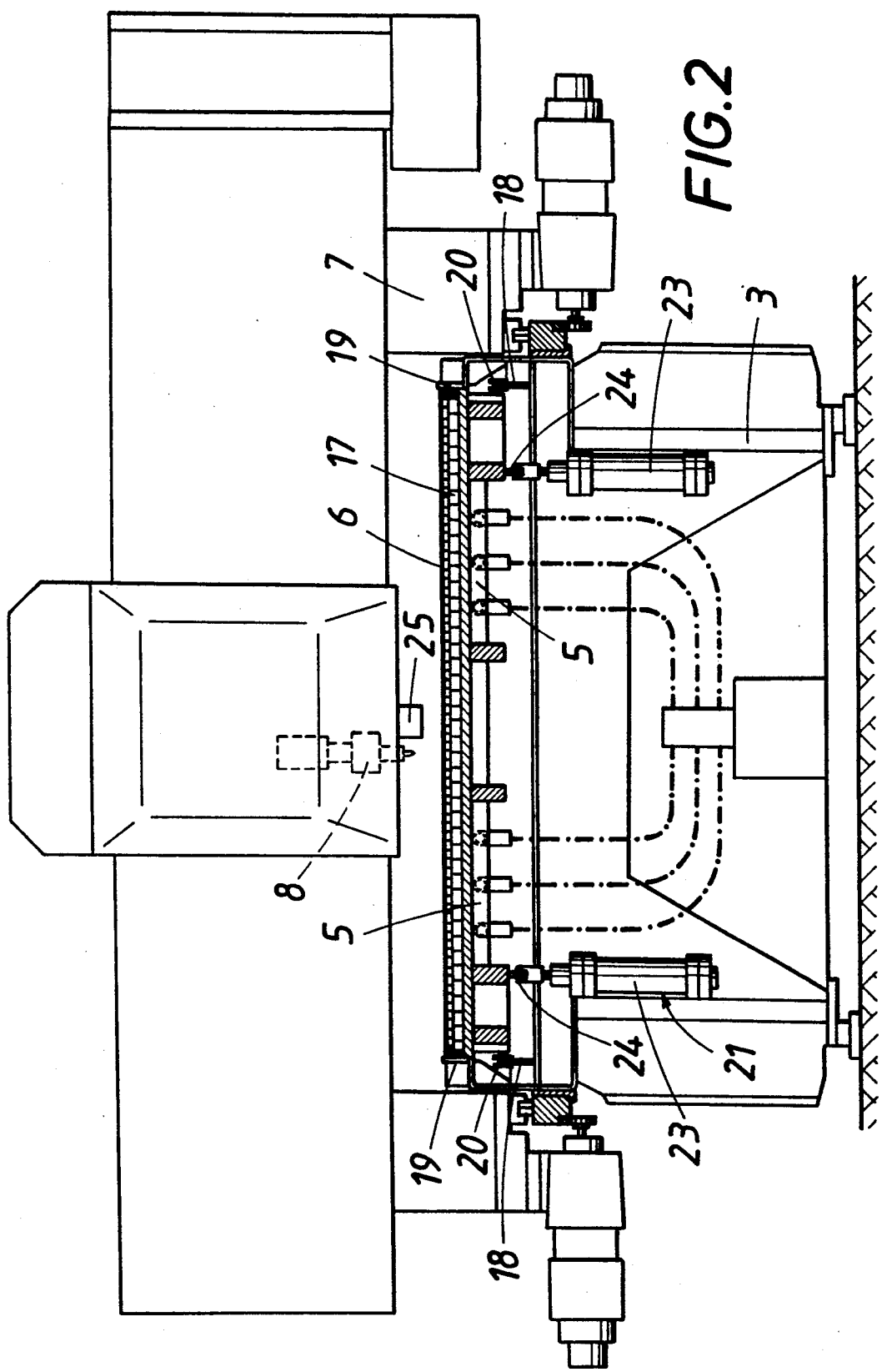

MACHINE TOOL, PARTICULARLY CUTTING MACHINE

BACKGROUND OF THE INVENTION

1. Field of the Invention

This invention relates to a machine tool, particularly to a cutting machine for processing flat stock, comprising a work table having a processing surface, which can preferably be subjected to a vacuum, and a tool carriage, which is movable along the processing surface, wherein a feeder is associated with the work table at one end thereof.

2. Description of the Prior Art

Such machine tools serve mainly to cut blanks out of strip material, such as prepregs, or to surface-finish flat workpieces etc. in an operation in which the flat stock to be processed is delivered by the feeder to the processing surface of the work table and by suitable holding-down members or preferably by the application of a vacuum is held down on the processing surface during the processing. After the processing the blanks or other workpieces must be removed to clear the processing surface for receiving additional flat stock. That operation will be rather time-consuming if the usual simple work tables are used, on which the processing surface corresponds to the cavity length or to the workpiece portion to be processed because additional flat stock cannot be applied before the processed workpieces and the waste have been removed from the processing surface. Other work tables, called conveyor tables, have been proposed, which comprise conveyor belts, which constitute the processing surface so that the flat stock can be deposited on the conveyor belt in a receiving region, which precedes the processing surface, and the conveyor belt is intermittently operated to move the stock to a processing region and subsequently to a delivery region so that the time is desirably utilized. But a machine tool for such an operation, in which stock can be deposited, processed and removed at the same time, requires a large space and a high structural expenditure because the machine table must have three times the size of the processing surface area.

U.S. Pat. No. 4,514,246 discloses cutting plants comprising two juxtaposed work tables so that the stock can be processed on one of the tables and stock can be removed from and deposited on the other table at the same time. Such plants are subject to the same remarks as the conveyor tables because the sequence of operations can be performed within a shorter time but the expenditure is increased by the provision of two fully equipped work tables and of feeders and tool means which reciprocate between the two tables.

SUMMARY OF THE INVENTION

It is an object of the invention to eliminate said disadvantages and to provide a machine tool which is of the kind described first hereinbefore and involves a relatively small structural expenditure and distinguishes by an economical mode of operation.

That object is accomplished in accordance with the invention in that the work table is supplemented toward the feeder by a receiving table having a receiving surface which has substantially the same size as the processing surface of the work table, and the machine table composed of the work table and the receiving table supports two pallets, which are reciprocable between positions on the work table and the receiving table and in alternation constitute the processing surface of the work table and the receiving surface of the receiving table. Because each pallet is used in alternation to provide a processing surface and a receiving surface, stock can be processed, on the one hand, and removed and deposited, on the other hand, at the same time so that the desired economical sequence of operations will be ensured. Experiments have shown that the processing time is about as long as the total of the removing and depositing times so that each step can be initiated before the preceding step has been completed and the positions of the pallets can be shifted virtually without a delay in that a pallet which carries new flat stock is moved to the work table and a pallet which carries processed workpieces is moved to the receiving table at the same time and it is possible to remove the processed workpieces and the waste and to deposit new stock during the time in which all processing steps are performed. In spite of the fact that stock is deposited and processed at the same time it is sufficient to provide a single work table equipped with suction boxes or other holding-down means and with a tool carriage and the like and it is sufficient to supplement that work table by a simple receiving table, which is merely required to support a pallet during the removal of workpieces and waste and the deposition of additional stock. A further advantage will be afforded by the fact that the receiving table can be designed for specific adaptation to a suitable stock feeder and suitable feeders for depositing stock in one layer or in a plurality of layers can be provided without difficulty. Besides, the pallets may be changed as required for adaptation to specific processing operations or to specific stock to be processed.

It is possible to provide two pallet tracks, which are spaced one over the other and extend along the machine table, and each of said tracks may be provided adjacent to the work table and the receiving table with means for lifting and lowering a pallet from one pallet track to the other. In that case the pallets can be shifted on different levels and suitable means may be provided for placing each pallet on each of the tables and for reciprocating the pallets between the two pallet tracks. As a result, the two pallets can be shifted at the same time and virtually directly so that the shifting times and the distance over which the pallets are shifted will be short whereas the structure may be simple.

To provide a simple and robust structure the pallets are supported on the pallet tracks by rollers, the lifting means comprise hydraulic cylinders, which are provided with rollers for engaging and supporting the pallets when they are in their end positions on the work table and the receiving table, and the upper pallet track is formed with recesses, which constitute passages for the laterally protruding rollers of the pallets when they are in said end positions. In such an arrangement each pallet track is associated with shifting means and the recesses in the raillike tracks permit the pallets to be lifted and lowered along a straight line. If the lower pallet track is disposed on the level of the table top, each pallet disposed on the lower track will be on the proper level for the processing operation so that a single lifting movement between the two tracks will be sufficient. If the lower pallet track is disposed above the level of the table top for reasons of design, the lower pallet track will also have to be formed with corresponding recesses so that the pallets can be lowered from the lower pallet track to the level of the table top. But on principle this will not be significant and one pallet track will guide each pallet as it is shifted in one direction and the other pallet track will guide each pallet as it is shifted in the opposite direction.

To permit an automation of the change of pallets, suitable actuating means for displacing the pallets are required and may inherently consist of any suitable drive comprising power screws, racks, chain drives. But it will be desirable to provide the tool carriage, on the one hand, and each pallet, on the other hand, with mutually associated coupling means so that the tool carriage can be coupled to each pallet and be used to reciprocate each pallet and the structural expenditure will further be reduced.

According to a particularly desirable further feature of the invention a laying carriage is mounted on the machine table to be movable along the receiving surface of the receiving table, the laying carriage and each pallet are provided with coupling means, which are associated with each other, and each pallet is provided on the side which faces to the feeder with the coupling means for cooperation with the laying carriage and on the side that is remote from the feeder with the coupling means for cooperating with the tool carriage. Such a laying carriage can be used to efficiently deposit flat stock onto each pallet when it is disposed on the receiving table, in a manner known per se, and laying carriages of various kinds can be used for that purpose, but the laying carriage can be used jointly with the tool carriage to shift the pallets. For such a change the two pallets are displaced by the two carriages in opposite directions over equal distances approximately to the middle of the shifting path and the pallets are subsequently uncoupled from one carriage and coupled to the other whereafter each carriage carries the respective other pallet along to the proper end position. In that case the carriages will have to travel only over shorter distances and that fact as well as the use of two carriages will substantially permit the pallets to be shifted in a much shorter time.

BRIEF DESCRIPTION OF THE DRAWING

FIG. 2 is a transverse sectional view taken on line II—II in FIG. 1.

DETAILED DESCRIPTION OF THE PREFERRED EMBODIMENT

Figure 1:
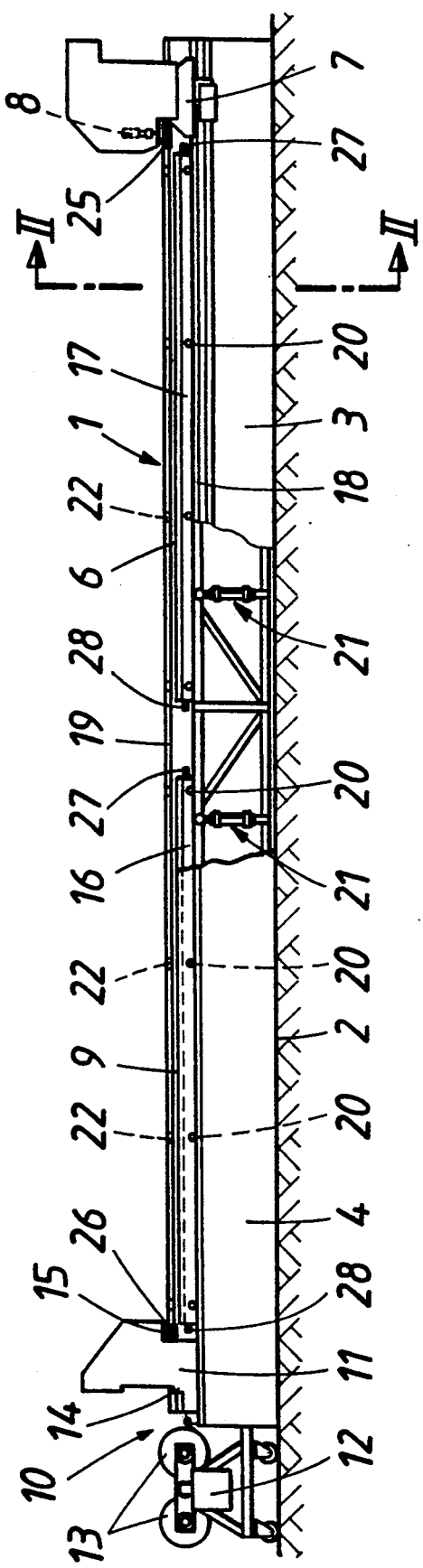
FIG. 1 is a side elevation showing partly in section a machine tool in accordance with the invention.

An illustrative embodiment of the invention will now be described with reference to the strictly schematic drawing.

A machine tool 1 for processing flat stock comprises a machine table 2, which is composed of a work table 3 and a receiving table 4 disposed at a receiving end of the work table 3. As clearly shown in FIGS. 3a–3e, work table 3 and receiving table 4 adjoin each other. The work table 3 is provided with a processing surface 6, which is adapted to be subjected to a vacuum by means of suction boxes 5 and on which the flat stock is retained while it is processed by means of a tool unit 8, such as an ultrasonic cutter, which is mounted on a tool carriage 7, which is movable along the processing surface of work table 3. The receiving table 4 is provided with a receiving surface 9, which has substantially the same size as the processing surface 6. The stock to be processed is deposited on the receiving surface and the processed stock is removed from the receiving surface. A feeder 10 is associated with the receiving table 4 and comprises a laying carriage 11, which is movable along the receiving surface 9, and a replaceable coil magazine 12, which contains coils 13 of flat stock that is to be processed. The laying carriage 11 comprises a gripper 14, which is only schematically indicated and is adapted to grip the flat stock at its free end so that the flat stock can be extended over the receiving surface by a suitable movement of the laying carriage 11. Marking means 15, by which the workpieces to be processed can be identified as the flat stock is deposited, as well as other means, such as means for cutting the flat stock to length, may be mounted on the laying carriage 11.

To permit depositing and removing operations, on the one hand, and processing operations, on the other hand, to be performed at the same time, the machine table 2 carries two pallets 16, 17, which are slidably mounted on the machine table 2 and are reciprocable between first and second end positions on the receiving table 4 and the work table 3, respectively. Said pallets 16 and 17 constitute in alternation the processing surface 6 of the work table 3 and the receiving surface 9 of the receiving table 4. The pallets are guided by two vertically spaced apart lower and upper pallet tracks 18, 19, which extend along the machine table 2 and on which respective pallets are supported by laterally protruding rollers 20. In each of the regions which contain the pallets when they are in their end positions over the work table 3 and the receiving table 4, respectively, (FIGS. 1 and 3a) a lifter 21 is provided for reciprocating the associated pallet 16 or 17 between the two pallet tracks 18 and 19. For that purpose the upper pallet track 19 is formed with inwardly open recesses 22, which constitute passages for the laterally protruding rollers 20 of the pallets, and the lifters 21 comprise hydraulic cylinders 23, which are provided with supporting rollers 24 for engaging the pallets as they are lifted and lowered.

To eliminate the need for separate drives for shifting the pallets, the tool carriage 7 and the laying carriage 11 are used as means for shifting the pallets 16, 17. For that purpose said carriages, on the one hand, and the pallets, on the other hand, are provided with coupling means 25, 26 and 27, 28, which are associated with each other. The coupling means 27, 28 of the pallets 16 and 17 are retaining members provided at opposite side edges thereof for engagement by coupling hooks 25 of tool carriage 7 and coupling hooks 26 of laying carriage 11. The coupling hooks are pivotal 180° about horizontal axes for engagement with, and disengagement from, retaining members 27, 28.

Figure 3A:
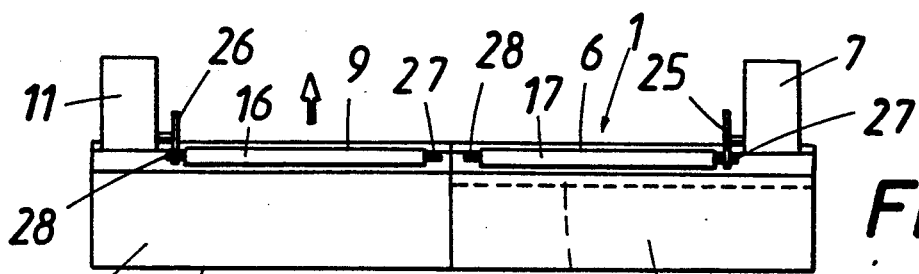
FIGS. 3a to 3e illustrate a plurality of phases of the operation in which the pallets are changed on that machine tool.
Figure 3B:
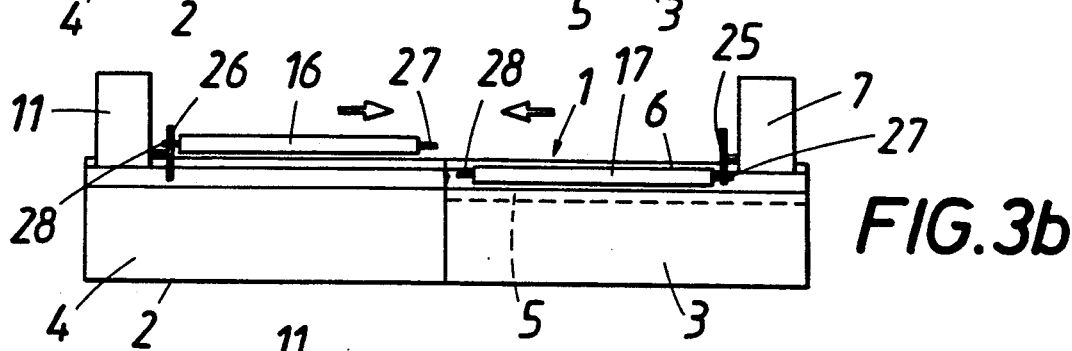
Figure 3C:
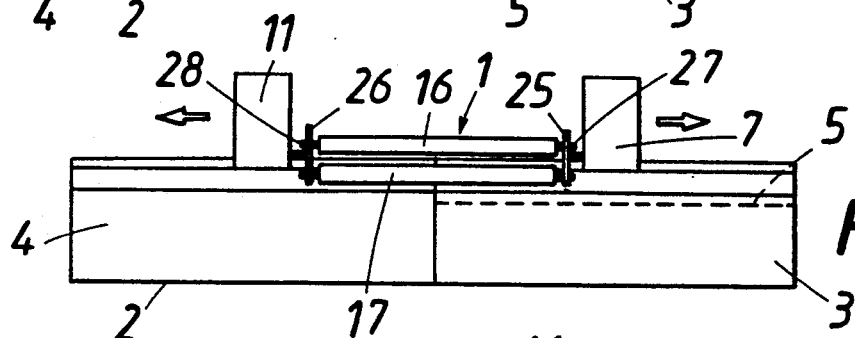
Figure 3D:
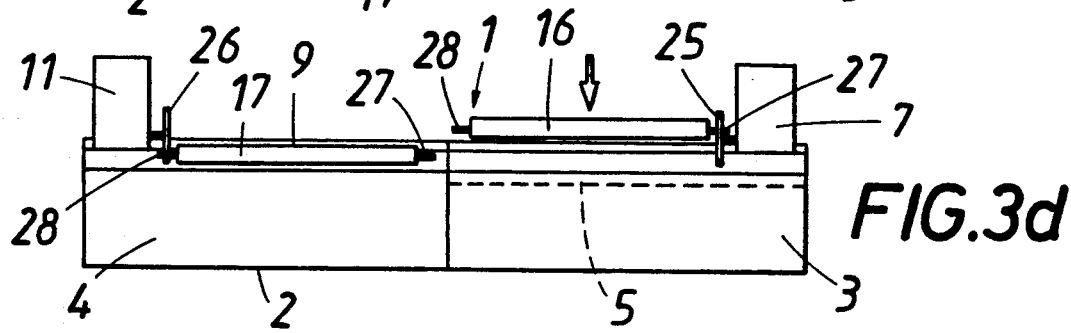
Figure 3E:
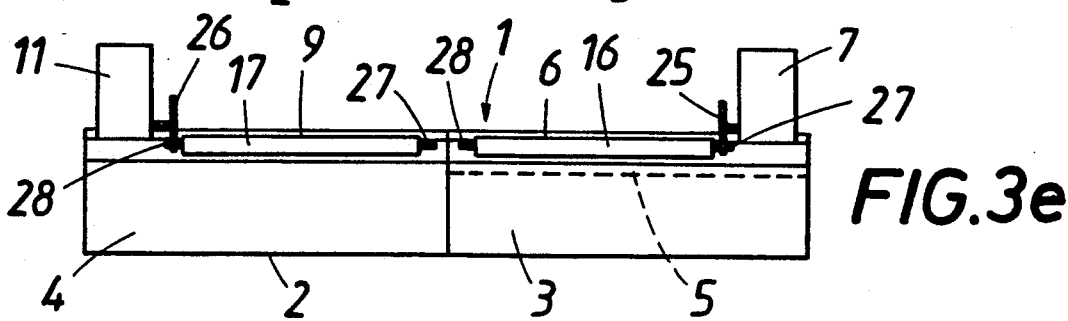
Figure 4:
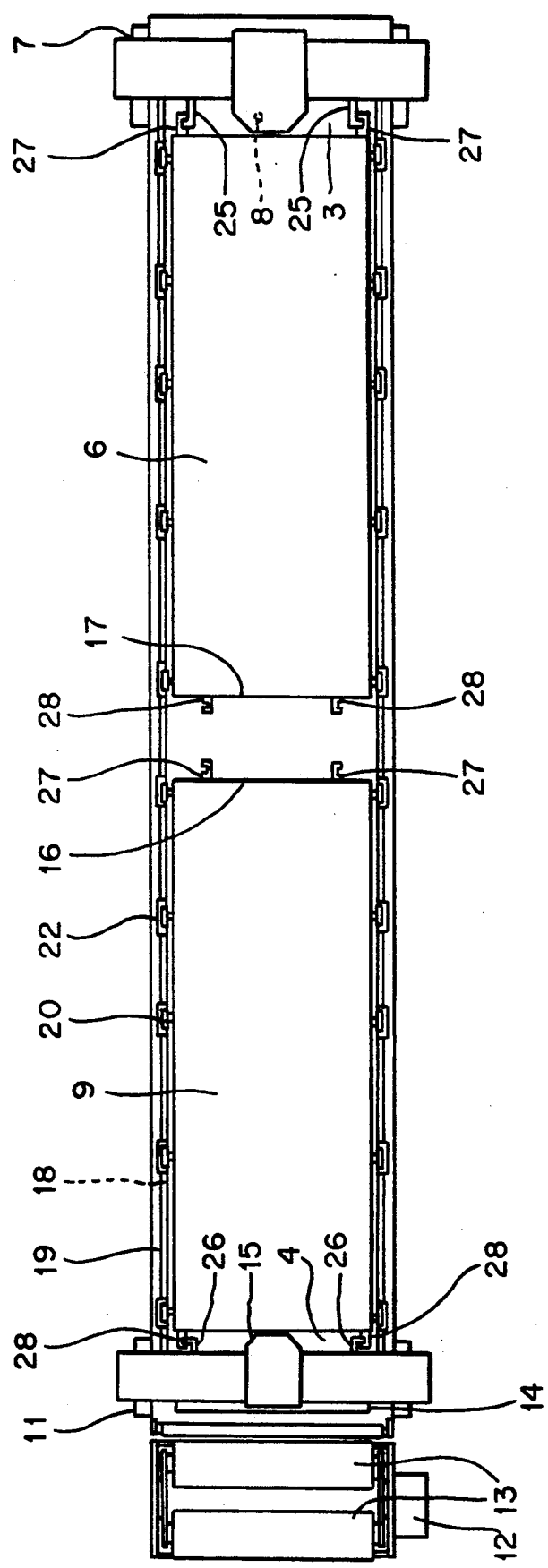
FIG. 4 is a plan view showing the machine tool of FIG. 1.

The sequence of operations performed by that machine tool is schematically illustrated in FIGS. 3a to 3e. In FIG. 3a the pallets 16 and 17 are shown in an initial position on the receiving table 4 and the work table 3, respectively. As the sequence of operation begins pallets 16, 17 are guided on lower pallet track 18 and the flat material to be processed can be deposited in one or more layers on the pallet 16 by means of the laying table 11 and it is possible to deposit layers of different materials one over the other. The laden pallet 16 is then lifted by the lifter 21 from the lower pallet track 18, which is on the level of the table top, into the upper pallet track 19 and the shifting of the pallets can now be initiated (FIG. 3b). For that purpose the laying carriage 11 and the tool carriage 7 are coupled each to the associated pallet 16 or 17 by the coupling means 25, 26 and 27, 28, respectively, and are moved in mutually opposite directions over equal distances toward each other until both pallets 16 and 17 are disposed approximately in the middle of the path along which they can be shifted (FIG. 3c). In that position the coupling hooks 3 of tool carriage 7 are pivoted to be disengaged from retaining members 27 of lower pallet 17 and to engage retaining members 28 of upper pallet 16 while coupling hooks 26 of laying carriage 11 are disengaged from upper pallet 16 and engaged with lower pallet 17. The laying carriage 11 is now coupled to the lower pallet 17 and the tool carriage 7 is coupled to the upper pallet 16 and the carriages coupled to the respective pallets thereafter return to their initial position (FIG. 3d) along lower and upper pallet tracks 18, 19. It will then be sufficient to lower by means of the lifter 21 the pallet 16, which carries the flat stock to be machined, onto the work table 3 (FIG. 3e) so that the laden pallet 16 now lies on the work table and the empty pallet 17 lies on the receiving table. The stock on the pallet 16 can then be properly processed by the tool unit 8 and new stock, which has not yet been processed, is placed on the empty pallet 17 at the same time. When the processing has completed, the pallets are shifted once more in the manner which has been described. Thereafter the pallet laden with new stock lies on the work table and the other pallet lies on the receiving table, which now serves also as the table from which the processed material is removed. As soon as the processed material has been removed, fresh stock can be placed on the pallet and the next shifting of pallets is effected. As the processing time is about as long as the sum of the removing and laying times, the cycle of operations comprising processing and pallet shifting is performed virtually without a delay.

It is apparent that an efficient operation can be performed by a machine which involves a comparatively small structural expenditure in a sequence in which the processing, on the one hand, and the depositing and removing of the flat stock and optionally also a proper marking of the workpieces, on the other hand, are performed at the same time and said steps to be matched to each other will not adversely affect each other.

I claim:
1. In a machine tool for processing flat stock, comprising
    a work table having a receiving end and a processing surface for supporting flat stock,
    a tool carriage mounted to be movable relative to said work table in a predetermined direction and comprising tool means for processing said flat stock supported on said processing surface, and
    a feeder for delivering flat stock adjacent to said receiving end of said work table,
    the improvement comprising
    a receiving table arranged adjacent to said receiving end of said work table and having a receiving surface of substantially the same size as said processing surface,
    said work table and said receiving table constituting a machine table,
    two pallets mounted on said machine table for supporting said flat stock, each pallet being reciprocable between a first end position, in which said pallet constitutes said receiving surface, and a second end position, in which said pallet constitutes said processing surface,
    actuating means for reciprocating each pallet on said machine table in opposition to the other pallet between said first and second end positions, and
    said feeder being operable to deposit the flat stock on each pallet when it is in said first end position.
2. The improvement set forth in claim 1 in which said tool means comprises cutting means.
3. The improvement set forth in claim 1 further comprising means for applying a vacuum for holding down said flat stock on said processing surface.
4. The improvement set forth in claim 1, wherein said machine table is provided with upper and lower pallet tracks, which are vertically spaced apart and extend in said predetermined direction along said receiving and work tables,
    each of said pallet tracks is adapted to support each of said pallets and to guide each pallet between said first and second end positions, and
    first and second lifting means are provided adjacent to said laying table and work table, respectively to said laying table and work table, respectively, and are operable to move each of said pallets from one of said pallet tracks to the other when said pallet is in one of said first and second end positions.
5. The improvement set forth in claim 4, wherein each of said lifting means comprises hydraulic cylinders provided with rollers for engaging and supporting each of said pallets when the pallet is in one of said first and second end positions.
6. The improvement set forth in claim 4, wherein
    each of said pallets is provided with laterally protruding rollers supported by said pallet tracks and
    said upper pallet track is formed adjacent to said pallets in said first and second end positions with inwardly open recesses, through which said rollers are adapted to move as each of said pallets is moved between said pallet tracks from one of said pallet tracks to the other.
7. The improvement set forth in claim 6, wherein said lower pallet track is also formed with such recesses.
8. The improvement set forth in claim 1, wherein
    each of said pallets is provided with first coupling means facing said tool carriage and
    said tool carriage is provided with second coupling means adapted to be selectively coupled to said first coupling means of each of said pallets.
9. The improvement set forth in claim 8, wherein
    each of said pallets is provided with third coupling means and
    a laying carriage is mounted on said machine table to be reciprocable in said predetermined direction to and from said tool carriage and is provided with fourth coupling means adapted to be selectively coupled to said third coupling means of each of said pallets.
10. The improvement set forth in claim 9, wherein each of said pallets has a first side edge facing said tool slide and provided with said first coupling means and has a second side face facing said feeder and provided with sid third coupling means.

* * * * *